(12) United States Patent
Vetters et al.

(10) Patent No.: US 8,075,438 B2
(45) Date of Patent: Dec. 13, 2011

(54) APPARATUS AND METHOD FOR TRANSMITTING A ROTARY INPUT INTO COUNTER-ROTATING OUTPUTS

(75) Inventors: Daniel K. Vetters, Indianapolis, IN (US); Robert W. Cedoz, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 484 days.

(21) Appl. No.: 12/406,133

(22) Filed: Mar. 18, 2009

(65) Prior Publication Data

US 2010/0147998 A1    Jun. 17, 2010

Related U.S. Application Data

(63) Continuation-in-part of application No. 12/332,916, filed on Dec. 11, 2008, now Pat. No. 8,021,267.

(51) Int. Cl.
*F16H 48/20* (2006.01)
(52) U.S. Cl. ........................................................ 475/248
(58) Field of Classification Search .................. None
See application file for complete search history.

(56) References Cited

U.S. PATENT DOCUMENTS

| | | | | |
|---|---|---|---|---|
| 1,329,387 A | * | 2/1920 | Fay | 416/124 |
| 1,434,620 A | * | 11/1922 | McCain | 416/129 |
| 2,228,638 A | * | 1/1941 | Mercier | 475/221 |
| 2,531,032 A | * | 11/1950 | Desmoulins | 475/248 |
| 5,120,516 A | | 6/1992 | Ham et al. | |
| 5,354,246 A | * | 10/1994 | Gotman | 475/248 |
| 5,813,214 A | | 9/1998 | Moniz et al. | |
| 6,010,304 A | | 1/2000 | Moniz et al. | |
| 6,071,076 A | | 6/2000 | Ansari et al. | |
| 6,546,735 B1 | | 4/2003 | Moniz et al. | |
| 6,619,030 B1 | | 9/2003 | Seda et al. | |
| 6,684,626 B1 | | 2/2004 | Orlando et al. | |
| 6,711,887 B2 | | 3/2004 | Orlando et al. | |
| 6,739,120 B2 | | 5/2004 | Moniz et al. | |
| 6,763,652 B2 | | 7/2004 | Baughman et al. | |
| 6,763,653 B2 | | 7/2004 | Orlando et al. | |
| 6,763,654 B2 | | 7/2004 | Orlando et al. | |
| 6,935,837 B2 | | 8/2005 | Moniz et al. | |
| 7,007,488 B2 | | 3/2006 | Orlando et al. | |
| 7,096,674 B2 | | 8/2006 | Orlando et al. | |
| 7,186,073 B2 | | 3/2007 | Orlando et al. | |
| 7,195,446 B2 | | 3/2007 | Seda et al. | |
| 7,195,447 B2 | | 3/2007 | Moniz et al. | |
| 7,269,938 B2 | | 9/2007 | Moniz et al. | |
| 7,290,386 B2 | | 11/2007 | Orlando et al. | |
| 7,296,398 B2 | | 11/2007 | Moniz et al. | |
| 7,334,392 B2 | | 2/2008 | Moniz et al. | |
| 7,334,981 B2 | | 2/2008 | Moniz et al. | |
| 7,353,647 B2 | | 4/2008 | Orlando et al. | |

(Continued)

*Primary Examiner* — Dirk Wright
(74) *Attorney, Agent, or Firm* — Krieg DeVault

(57) ABSTRACT

An apparatus and method for transmitting a rotary input into counter-rotating outputs is disclosed herein. An exemplary apparatus for performing the method includes a planetary gear set having a sun gear rotatable by a rotary input, a plurality of planet gears in meshed engagement with the sun gear, a carrier coupling the plurality of planet gears together, and a ring gear encircling and in meshed engagement with the plurality of planet gears. The exemplary apparatus also includes a first shaft member coupled to the carrier for transmitting motion in a first rotational direction. The exemplary apparatus also includes a second shaft member coupled to the ring gear for transmitting motion in a second rotational direction opposite the first rotational direction. The first shaft member at least partially encircles the second shaft member.

20 Claims, 3 Drawing Sheets

U.S. PATENT DOCUMENTS

| | | |
|---|---|---|
| 7,458,202 B2 | 12/2008 | Moniz et al. |
| 7,490,460 B2 | 2/2009 | Moniz et al. |
| 7,490,461 B2 | 2/2009 | Moniz et al. |
| 7,493,753 B2 | 2/2009 | Moniz et al. |
| 7,493,754 B2 | 2/2009 | Moniz et al. |
| 7,510,371 B2 | 3/2009 | Orlando et al. |
| 7,513,102 B2 | 4/2009 | Moniz et al. |
| 7,513,103 B2 | 4/2009 | Orlando et al. |
| 7,526,913 B2 | 5/2009 | Orlando et al. |
| 2003/0163984 A1 | 9/2003 | Seda et al. |
| 2004/0020186 A1 | 2/2004 | Orlando et al. |
| 2006/0288686 A1 | 12/2006 | Cherry et al. |
| 2007/0084183 A1 | 4/2007 | Moniz et al. |
| 2007/0084186 A1 | 4/2007 | Orlando et al. |
| 2007/0087892 A1 | 4/2007 | Orlando et al. |
| 2007/0125066 A1 | 6/2007 | Orlando et al. |
| 2007/0137175 A1 | 6/2007 | Moniz |
| 2007/0157596 A1 | 7/2007 | Moniz |
| 2007/0234704 A1 | 10/2007 | Moniz et al. |
| 2007/0240399 A1 | 10/2007 | Orlando et al. |
| 2008/0014095 A1 | 1/2008 | Moniz et al. |
| 2008/0053099 A1 | 3/2008 | Venkataramani et al. |
| 2008/0053100 A1 | 3/2008 | Venkataramani et al. |
| 2008/0072567 A1 | 3/2008 | Moniz et al. |
| 2008/0072568 A1 | 3/2008 | Moniz et al. |
| 2008/0072569 A1 | 3/2008 | Moniz et al. |
| 2008/0075590 A1 | 3/2008 | Moniz et al. |
| 2008/0098713 A1 | 5/2008 | Orlando et al. |
| 2008/0098714 A1 | 5/2008 | Orlando et al. |
| 2008/0098715 A1 | 5/2008 | Orlando et al. |
| 2008/0098716 A1 | 5/2008 | Orlando et al. |
| 2008/0098717 A1 | 5/2008 | Orlando et al. |
| 2008/0098718 A1 | 5/2008 | Henry et al. |
| 2008/0110152 A1 | 5/2008 | Kemper et al. |
| 2008/0110153 A1 | 5/2008 | Seda et al. |
| 2008/0110154 A1 | 5/2008 | Kemper et al. |
| 2008/0112791 A1 | 5/2008 | Lee et al. |
| 2008/0112793 A1 | 5/2008 | Lee et al. |
| 2008/0112794 A1 | 5/2008 | Lee et al. |
| 2008/0112795 A1 | 5/2008 | Lee et al. |
| 2008/0112801 A1 | 5/2008 | Moniz et al. |
| 2008/0112802 A1 | 5/2008 | Orlando et al. |
| 2008/0148708 A1 | 6/2008 | Chou et al. |
| 2008/0148881 A1 | 6/2008 | Moniz et al. |
| 2008/0152477 A1 | 6/2008 | Moniz et al. |
| 2008/0159851 A1 | 7/2008 | Moniz et al. |
| 2008/0159852 A1 | 7/2008 | Stephenson et al. |
| 2008/0159856 A1 | 7/2008 | Moniz et al. |
| 2009/0064683 A1 | 3/2009 | Moniz et al. |
| 2010/0151985 A1* | 6/2010 | Vetters et al. ............ 475/331 |

* cited by examiner

APPARATUS AND METHOD FOR TRANSMITTING A ROTARY INPUT INTO COUNTER-ROTATING OUTPUTS

CROSS-REFERENCE TO RELATED APPLICATIONS

This application is a continuation-in-part of application Ser. No. 12/332,916 for a COUPLING ASSEMBLY, filed on Dec. 11, 2008 now U.S. Pat. No. 8,021,267, which is hereby incorporated by reference in its entirety.

BACKGROUND OF THE INVENTION

1. Field of the Invention

The invention relates to converting a rotary input into counter-rotating outputs, such as in dual propeller arrangements in air and sea craft.

2. Description of Related Prior Art

U.S. Pat. No. 4,817,382 discloses a turboprop propulsion apparatus. A turboprop propulsion apparatus is one of numerous applications in which two shafts are coupled together. The turboprop propulsion apparatus of the '382 patent includes a core engine that is connected through a planetary drive transmission to counter-rotating propellers. One of the propellers is connected to the ring gear and the other is connected to the planetary gear carrier.

SUMMARY OF THE INVENTION

In summary, the invention is an apparatus and method for transmitting a rotary input into counter-rotating outputs. An exemplary apparatus for performing the method includes a planetary gear set having a sun gear rotatable by a rotary input, a plurality of planet gears in meshed engagement with the sun gear, a carrier coupling the plurality of planet gears together, and a ring gear encircling and in meshed engagement with the plurality of planet gears. The exemplary apparatus also includes a first shaft member coupled to the carrier for transmitting motion in a first rotational direction. The exemplary apparatus also includes a second shaft member coupled to the ring gear for transmitting motion in a second rotational direction opposite the first rotational direction. The first shaft member at least partially encircles the second shaft member.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EXEMPLARY EMBODIMENTS

Figure 1:
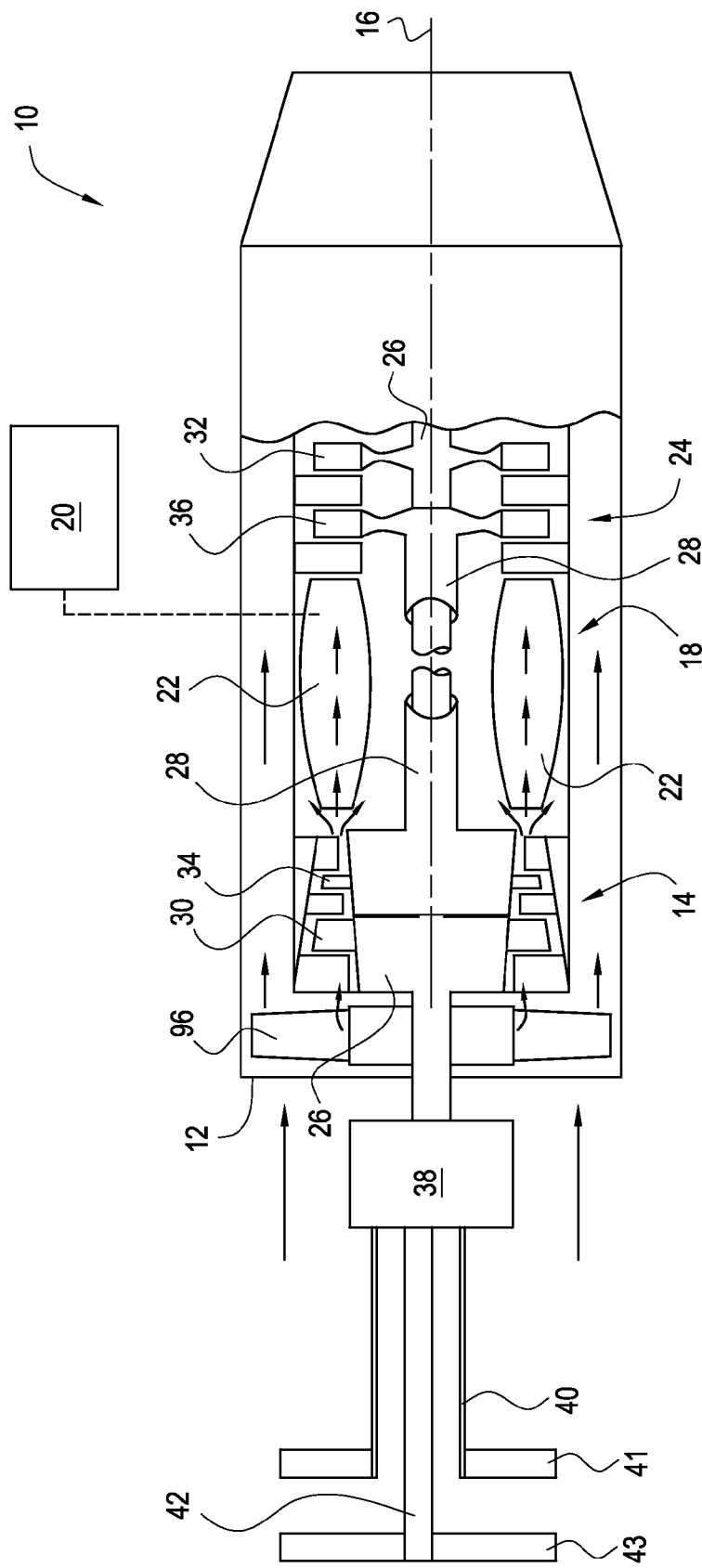
FIG. 1 is a schematic of a turbine engine which incorporates an exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic suffix. Also, to enhance consistency, the structures in any particular drawing share the same alphabetic suffix even if a particular feature is shown in less than all embodiments. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The exemplary embodiments of the invention define apparatus and perform methods for transmitting a rotary input into counter-rotating outputs. These exemplary embodiments strike a desirable balance between maintaining suitable rotational speed between propeller rows, delivering slightly more power to the forward row of propellers, and staying under a threshold value for acceptable blade tip speed. These design goals can be balanced particularly well by the exemplary embodiments of the invention set forth herein.

The power delivered to a rotatable propeller row is the product of torque and rotational speed. Since it can be desirable to maintain a suitable rotational speed relationship between propeller rows, the delivery of different levels of power to the propeller rows involves delivering different levels of torque to the respective shafts driving the propeller rows. The rows of propellers can be driven in rotation through a planetary gear arrangement or some other driving arrangement. For example, a first row of propellers can be driven by the carrier of the planetary gear arrangement and a second row of propellers can be driven by the ring gear of the planetary gear arrangement. By manipulating the gear ratios and speeds of the planetary gear arrangement, the power ratio can approach 1:1 between the power transmitted by the ring gear and the power transmitted by the carrier. If the speed of the ring gear and the speed of the carrier are the same, the carrier will transmit more power than the ring gear. However, if the speed of the ring gear can be greater than the speed of the carrier, the ring gear can transmit more power than the carrier. A balance of speeds and gear ratios can achieve a 1:1 power ratio.

Increasing the rotational speed of the propeller rows, generally, can create design complications. For example, the speed that a propeller row can rotate is limited by the speed of rotation at the tip of the propellers. As propeller speed increases, the radial distance between the tip and the axis of rotation may be required to decrease. As the radial distance between the tip and the axis of rotation decreases, the efficiency of each propeller can decrease. Therefore, as set forth above, it can be desirable to minimize the rotational speed of the propeller rows. Of course, "minimizing" is relative and the speed of the propeller rows will be sufficient to propel the craft.

The invention thus provides arrangements to deliver power from a source of relatively higher torque and relatively lower rotational speed. In the exemplary embodiments, this source is the carrier of a planetary gear arrangement. In other embodiments of the invention, this source could be some other structure. The exemplary embodiments of the invention have been found to be desirable in pusher propeller arrangements, but the invention could be applied in tractor propeller arrangements as well.

FIG. 1 schematically shows a turbine engine 10. The various unnumbered arrows represent the flow of air through the turbine engine 10. Not all possible fluid flow paths are shown in FIG. 1. The turbine engine 10 can produce power for different kinds of applications, including vehicle propulsion and power generation among others. The exemplary embodiments of the invention disclosed herein, as well as other embodiments of the broader invention, can be practiced in any configuration of turbine engine and in any application other than turbine engines in which rotary input (or torque) is transmitted to more than one counter-rotating outputs.

The exemplary turbine engine 10 can include an inlet 12 to receive fluid such as air. The turbine engine 10 can also include a compressor section 14 to receive the fluid from the inlet 12 and compress the fluid. The compressor section 14 can be spaced from the inlet 12 along a centerline axis 16 of the turbine engine 10. The turbine engine 10 can also include a combustor section 18 to receive the compressed fluid from the compressor section 14. The compressed fluid can be mixed with fuel from a fuel system 20 and ignited in an annular combustion chamber 22 defined by the combustor section 18. The turbine engine 10 can also include a turbine section 24 to receive the combustion gases from the combustor section 18. The energy associated with the combustion gases can be converted into kinetic energy (motion) in the turbine section 24. The turbine engine 10 may include a fan 96 to direct fluid into the inlet 12.

In FIG. 1, shafts 26, 28 are shown disposed for rotation about the centerline axis 16 of the turbine engine 10. Alternative embodiments of the invention can include any number of shafts. The shafts 26, 28 can be journaled together for relative rotation. The shaft 26 can be a low pressure shaft supporting compressor blades 30 of a low pressure portion of the compressor section 14. The shaft 26 can also support low pressure turbine blades 32 of a low pressure portion of the turbine section 24.

The shaft 28 encircles the shaft 26. As set forth above, the shafts 26, 28 can be journaled together, wherein bearings are disposed between the shafts 26, 28 to permit relative rotation. The shaft 28 can be a high pressure shaft supporting compressor blades 34 of a high pressure portion of the compressor section 14. The shaft 28 can also support high pressure turbine blades 36 of a high pressure portion of the turbine section 24.

The low pressure shaft 26 can drive other structures, such as a gear train, a fan, one or more propeller shafts, a rotor, a tower shaft or any other shaft, or any other structure. In the schematic view of FIG. 1, the low pressure shaft 26 can be coupled to a propeller gear box assembly 38. The propeller gear box assembly 38 can transmit torque/rotation from the low pressure shaft 26 to first and second shaft members 40, 42. The first shaft member 40 is engaged with a first propeller row 41 and the second shaft member 42 is engaged with a second propeller row 43. The first propeller row 41 can be closer to the propeller gear box assembly 38 than the second propeller row 43.

The exemplary shaft members 40, 42 are shown aligned with the centerline axis 16 of the engine 10, but other embodiments could have shaft members that are not aligned with the engine centerline axis 16. Also, in alternative embodiments of the invention, the propeller gear box assembly 38 can receive input power from structures other than the low pressure shaft 26. The first and second shaft members 40, 42 can be disposed in either tractor or pusher arrangements when the turbine engine 10 is mounted to a vehicle.

Figure 2:
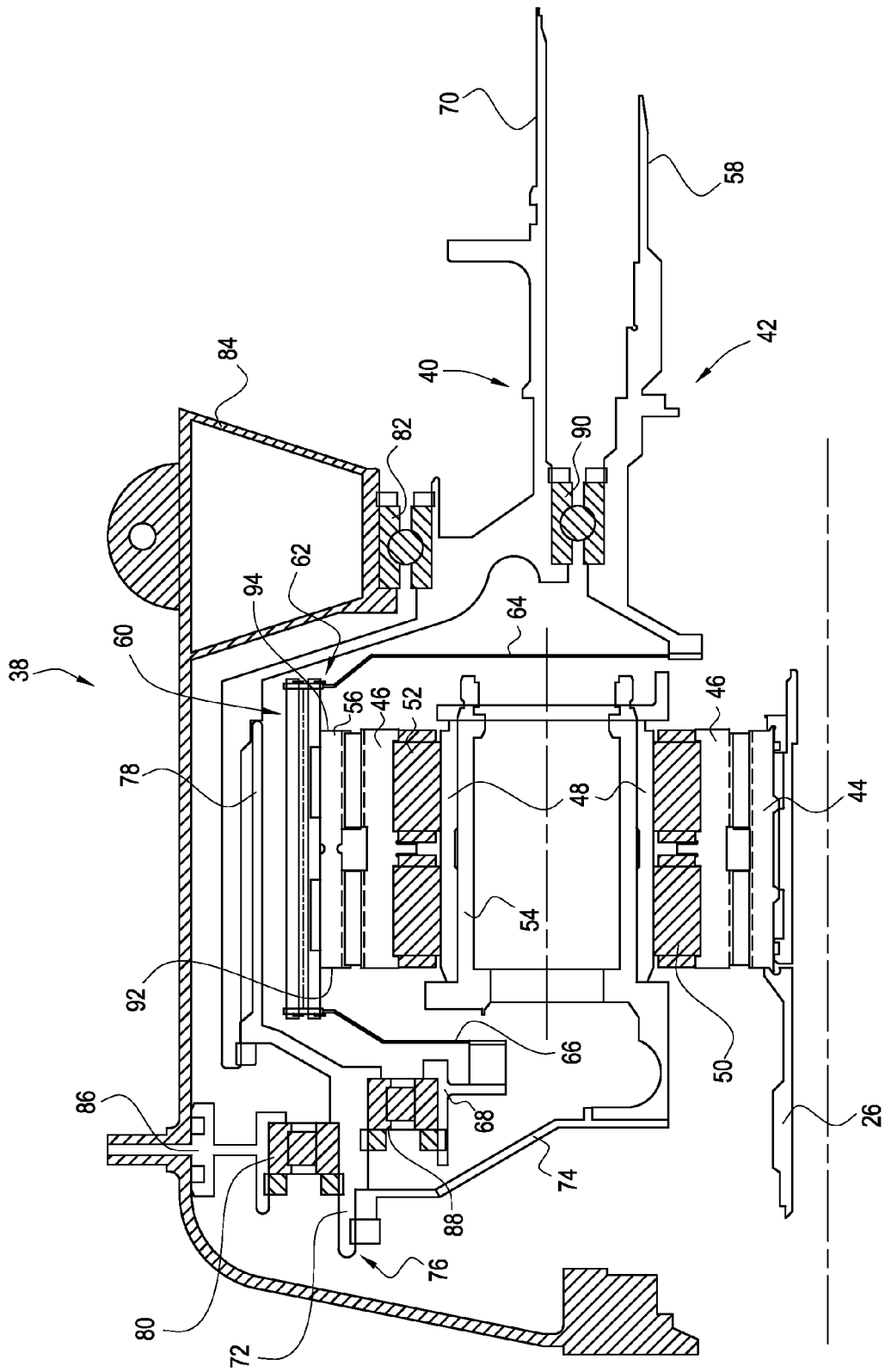
FIG. 2 is an axial cross-section of a portion of a first exemplary embodiment of the invention.

As shown in FIG. 2, the propeller gear box assembly 38 can receive an end portion of the input shaft 26. It is noted that other structures can deliver power to the propeller gear box assembly 38, such as a free power turbine. A free power turbine can be positioned at the exit of the turbine section of a turbine engine and be driven to high speeds, with relatively low torque. The exemplary propeller gear box assembly 38 can include a planetary gear assembly. A sun gear 44 can be engaged with the shaft 26 for concurrent rotation. A plurality of planetary gears, such as the planetary gear 46, can be meshed with the sun gear 44 and be operable to orbit about the sun gear 44. The planetary gear 46 can be mounted on a lay shaft 48 and supported by bearings 50, 52. A planetary gear carrier 54 can couple all of the planetary gears meshed with the sun gear 44, including the planetary gear 46. A ring gear 56 can surround the plurality of planetary gears, including the planetary gear 46.

The propeller gear box assembly 38 can transmit the rotary power input from the shaft 26 to both shaft members 40, 42. Power can be transmitted to the first shaft member 40 through the planetary gear carrier 54. Power can be transmitted to the second shaft member 42 through the ring gear 56. The shaft members 40, 42 will be counter-rotating.

In the first exemplary embodiment of the invention, the second shaft member 42 can include a generally cylindrical portion 58 extending to the second propeller row 43 (shown in FIG. 1). The second shaft member 42 can also include a coupling assembly 60 connecting the generally cylindrical portion 58 to the ring gear 56. The coupling assembly 60 can include a socket assembly 62 encircling and rotatably fixed to the ring gear 56. Examples of socket assemblies are set forth in a co-pending application to the same inventors and the co-pending application is hereby incorporated by reference. The second shaft member 42 can also include a diaphragm plate 64 extending between the socket assembly 62 and the generally cylindrical portion 58. The diaphragm plate 64 can accommodate axial movement between the portion 58 and the gear assembly 38.

The first exemplary embodiment of the second shaft member 42 can also include a second diaphragm plate 66 positioned on an opposite side of the planetary gear assembly 38 relative to the diaphragm plate 64 and a shaft portion 68 supporting the diaphragm plate 66. The arrangement of the first exemplary embodiment, wherein the second shaft member 42 extends axially past forward and aft sides 92, 94 of the ring gear 56, can be desirable to enhance the stability of the connection between the socket assembly 62 and the ring gear 56.

In the first exemplary embodiment of the invention, the first shaft member 40 can include a generally cylindrical shaft portion 70 extending to the first propeller row 41 (shown in FIG. 1). The first shaft member 40 can also include shaft portions 72 and 74. The shaft portion 74 can be rotationally fixed to the carrier ring 54. The shaft portion 72 can be rotationally fixed to the shaft portion 74 at one end 76 and can define a spline connection at an opposite end 78. The exemplary first shaft member 40 can thus extend around the ring gear 56 and encircle the second shaft member 42.

The shaft portion 70 can also define splines to mate with the splines at the end 78 of the shaft portion 72. The spline connection is defined at an enlarged diameter portion of the first shaft member 40 and allows the shaft portions 70, 72 to be rotationally fixed and yet axially movable relative to one another. Positioning the spline connection at the periphery of the ring gear 56 can be desirable to ease assembly of embodiments of the invention.

Bearings 80, 82 can be positioned to support the first shaft member 40 for rotation relative to outer housing structures 84, 86. Bearings 88, 90 can be positioned to support the second shaft member 42 for rotation relative to the first shaft member 40.

In the first exemplary embodiment of the invention (assuming equal speeds of the propeller rows), generally about 60% of the power received from the input shaft 26 can be transmitted to the first shaft member 40 and about 40% of the power received from the input shaft 26 can be transmitted to the second shaft member 42. Assuming a pusher configuration, the first shaft member 40 can turn the forward-most or primary propellers and the second shaft member 42 can turn the aft-most or counter-rotating propellers. In alternative embodiments of the invention, the gear ratios of the planetary gear assembly 38 can be modified to vary the power distribution.

Figure 3:
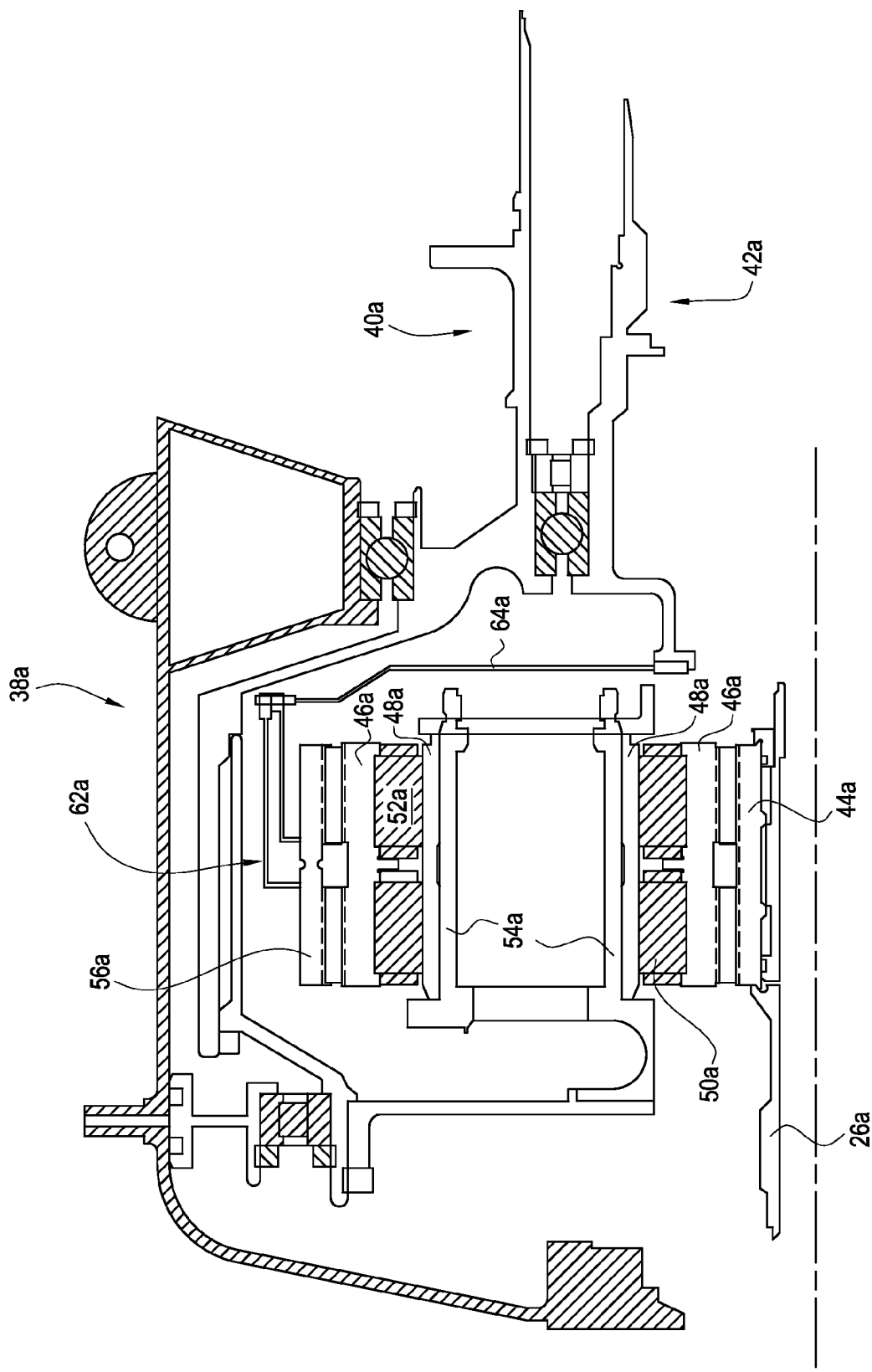
FIG. 3 is an axial cross-section of a portion of a second exemplary embodiment of the invention.

FIG. 3 shows a second exemplary embodiment of the invention. A propeller gear box assembly 38a can receive an end portion of an input shaft 26a. A sun gear 44a can be engaged with the shaft 26a for concurrent rotation. A plurality of planetary gears, such as the planetary gear 46a, can be meshed with the sun gear 44a and be operable to orbit about the sun gear 44a. The planetary gear 46a can be mounted on a lay shaft 48a and supported by bearings 50a, 52a. A planetary gear carrier 54a can couple all of the planetary gears meshed with the sun gear 44a, including the planetary gear 46a. A ring gear 56a can surround the plurality of planetary gears, including the planetary gear 46a.

The propeller gear box assembly 38a can transmit the rotary power input from the shaft 26a to a first shaft member 40a and a second shaft member 42a. Power can be transmitted to the first shaft member 40a through the planetary gear carrier 54a. Power can be transmitted to the second shaft member 42a through the ring gear 56a. The shaft members 40a, 42a will be counter-rotating.

The second exemplary embodiment shown in FIG. 3 is substantially similar to the first exemplary embodiment shown in FIG. 2. However, in the second exemplary embodiment, the second shaft member 42a does not extend around the ring gear 56a. A socket assembly 62a of the second shaft member 42a can be cantilevered off a diaphragm plate 64a. This arrangement can be desirable reduce the cost and complexity of embodiments of the invention.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for transmitting a rotary input into counter-rotating outputs comprising:
a planetary gear set having a sun gear rotatable by a rotary input, a plurality of planet gears in meshed engagement with said sun gear, a carrier coupling said plurality of planet gears together, and a ring gear encircling and in meshed engagement with said plurality of planet gears;
a first shaft member coupled to said carrier for transmitting motion in a first rotational direction; and
a second shaft member coupled to said ring gear for transmitting motion in a second rotational direction opposite the first rotational direction, wherein said first shaft member at least partially encircles said second shaft member.

2. The apparatus of claim 1 wherein said first shaft member extends around said ring gear.

3. The apparatus of claim 1 wherein about sixty percent of a power output of said planetary gear set is transmitted to said first shaft member.

4. The apparatus of claim 1 wherein said first shaft member is formed from a plurality of shaft portions rotationally fixed together.

5. The apparatus of claim 4 wherein said plurality of shaft portions are axially moveable relative to one another.

6. The apparatus of claim 4 wherein said first shaft member includes an enlarged diameter portion encircling said ring gear and said plurality of sub-members are coupled together at said enlarged diameter portion.

7. The apparatus of claim 6 wherein said plurality of sub-members are coupled together at said enlarged diameter portion with splines for relative axial movement.

8. A method comprising the steps of:
inputting rotary power to a propeller gear box assembly;
directing a first portion of the rotary power to a first propeller row through a first shaft member coupled to the propeller gear box assembly;
directing a second portion of the rotary power to a second propeller row through a second shaft member coupled to the propeller gear box assembly, the second portion of rotary power being less than the first portion of rotary power; and
positioning the first propeller row closer to the propeller gear box assembly than the second propeller row.

9. The method of claim 8 further comprising the step of:
rotating the first propeller row and the second propeller row in opposite directions.

10. The method of claim 9 further comprising the step of:
positioning the first propeller row and the second propeller row in a pusher arrangement.

11. The method of claim 10 further comprising the step of:
communicating rotary power to the first and second shaft members with a planetary gear set disposed in the propeller gear box assembly.

12. The method of claim 11 further comprising the steps of:
coupling the first shaft member to a carrier of the planetary gear set; and
coupling the second shaft member to a ring gear of the planetary gear set.

13. The method of claim 8 further comprising the step of:
bifurcating the first shaft member into a plurality of axial shaft portions rotationally fixed together.

14. The method of claim 8 further comprising the step of:
rotating the first and second shaft members at substantially the same speed.

15. A propulsion apparatus comprising:
a turbine engine including an output shaft operable to deliver rotary power;
a sun gear arranged for rotation with said output shaft;
a plurality of planetary gears operable to mesh with said sun gear;
a planetary gear carrier joining said plurality of planetary gears;
a ring gear surrounding and meshing with said plurality of planetary gears;
a first shaft member coupled to said planetary gear carrier for transmitting motion in a first rotational direction;
a first propeller row driven in rotation by said first shaft member;
a second shaft member coupled to said ring gear for transmitting motion in a second rotational direction opposite the first rotational direction; and
a second propeller row driven in rotation by said second shaft member, wherein said first propeller row is positioned closer to said planetary gear carrier than said second propeller row.

16. The propulsion apparatus of claim 15 wherein said first and second propeller rows are positioned in a pusher arrangement relative to said turbine engine.

17. The propulsion apparatus of claim 15 wherein said first shaft member at least partially encircles said second shaft member.

18. The propulsion apparatus of claim 15 wherein a greater quantity of rotary power is transmitted through said first shaft member than said second shaft member.

19. The propulsion apparatus of claim 18 wherein about sixty percent of said quantity of rotary power is transmitted through said first shaft member and wherein said first and second shaft members are rotating at substantially the same speed.

20. The propulsion apparatus of claim 15 wherein said first shaft member is formed from a plurality of shaft portions rotationally fixed together and axially moveable relative to one another for assembly around said ring gear.

* * * * *

UNITED STATES PATENT AND TRADEMARK OFFICE
CERTIFICATE OF CORRECTION

| | | |
|---|---|---|
| PATENT NO. | : 8,075,438 B2 | Page 1 of 1 |
| APPLICATION NO. | : 12/406133 | |
| DATED | : December 13, 2011 | |
| INVENTOR(S) | : Daniel K. Vetters et al. | |

It is certified that error appears in the above-identified patent and that said Letters Patent is hereby corrected as shown below:

On the Title Page, Item [75] Add the following inventors: Kenneth John Mackie, Derby (GB); David Michael Beaven, Nottingham (GB)

Signed and Sealed this
Thirtieth Day of July, 2013

Teresa Stanek Rea
*Acting Director of the United States Patent and Trademark Office*